US009694329B2

(12) United States Patent
Markle et al.

(10) Patent No.: US 9,694,329 B2
(45) Date of Patent: *Jul. 4, 2017

(54) MIXER ASSEMBLY APPARATUS AND METHOD

(75) Inventors: Stephen L. Markle, Holley, NY (US); Michael E. McCarroll, West Henrietta, NY (US)

(73) Assignee: SPX Corporation, Charlotte, NC (US)

( * ) Notice: Subject to any disclaimer, the term of this patent is extended or adjusted under 35 U.S.C. 154(b) by 749 days.

This patent is subject to a terminal disclaimer.

(21) Appl. No.: 13/615,855

(22) Filed: Sep. 14, 2012

(65) Prior Publication Data

US 2013/0188441 A1 Jul. 25, 2013

Related U.S. Application Data

(60) Provisional application No. 61/590,188, filed on Jan. 24, 2012.

(51) Int. Cl.
*B01F 7/00* (2006.01)
*B01F 15/00* (2006.01)

(52) U.S. Cl.
CPC .......... *B01F 7/00058* (2013.01); *B01F 7/002* (2013.01); *B01F 15/00006* (2013.01); *B01F 15/0072* (2013.01); *B01F 15/00662* (2013.01); *Y10T 29/49817* (2015.01); *Y10T 29/49826* (2015.01); *Y10T 403/581* (2015.01)

(58) Field of Classification Search
CPC ................ B01F 7/0005; B01F 7/00058; B01F 15/00662; B01F 15/00668; B01F 15/00681; B01F 15/0072; B01F 15/00006; B01F 7/002

USPC .............................. 366/270, 308, 330.1, 254
See application file for complete search history.

(56) References Cited

U.S. PATENT DOCUMENTS

| 1,421,932 | A |   | 7/1922  | Foster |            |
|-----------|---|---|---------|--------|------------|
| 1,841,435 | A | * | 1/1932  | Gibson | ........................ 366/308 |
| 2,007,361 | A |   | 12/1934 | Berger |            |
| 2,896,926 | A | * | 7/1959  | Chapman | ........................ 416/66 |
| 3,559,962 | A | * | 2/1971  | Enssle et al. | ................. 366/308 |
| 4,396,291 | A | * | 8/1983  | Simmonds | .................... 366/282 |
| 4,753,534 | A |   | 6/1988  | Markle |            |
| 4,872,764 | A | * | 10/1989 | McClean | ....................... 366/251 |
| 5,282,681 | A | * | 2/1994  | Supelak | ........................ 366/246 |
| 5,366,289 | A | * | 11/1994 | Supelak | ........................ 366/308 |
| 5,368,390 | A |   | 11/1994 | Gambrill et al. |     |
| 5,480,228 | A |   | 1/1996  | Gambrill et al. |     |

(Continued)

FOREIGN PATENT DOCUMENTS

DE            922631 C     1/1955
DE         10212514 A1    10/2003
(Continued)

OTHER PUBLICATIONS

European Search Report/Written Opinion mailed Apr. 25, 2013 for European Application No. 13152420.9 (Publication No. 2620210).

*Primary Examiner* — Charles Cooley
*Assistant Examiner* — Marc C Howell
(74) *Attorney, Agent, or Firm* — Baker Hostetler LLP

(57) ABSTRACT

A mixing apparatus and system includes a hub, a plurality of blades, and a respective hinge for each blade to pivotally secure each blade to the hub. Each hinge including a lock having a tab and a detent to secure the respective blade in an operating conformation.

8 Claims, 9 Drawing Sheets

(56) References Cited

U.S. PATENT DOCUMENTS

| | | | |
|---|---|---|---|
| 5,765,947 A | | 6/1998 | Dubroy |
| 5,941,636 A | * | 8/1999 | Lu .................................. 366/249 |
| 7,318,668 B2 | | 1/2008 | Bielozer |
| 7,874,719 B2 | | 1/2011 | Markle et al. |
| 2013/0044562 A1 | | 2/2013 | Selenius |
| 2013/0185911 A1 | | 7/2013 | Markle et al. |
| 2013/0188441 A1 | | 7/2013 | Markle et al. |
| 2013/0188445 A1 | | 7/2013 | Markle et al. |
| 2014/0175751 A1 | | 6/2014 | Schmitz et al. |

FOREIGN PATENT DOCUMENTS

| | | | |
|---|---|---|---|
| DE | 202004004101 U1 | | 7/2004 |
| EP | 1541224 B1 | | 6/2007 |
| EP | 2620210 A1 | | 7/2013 |
| GB | 115933 A | | 5/1918 |
| GB | 520474 | * | 4/1940 |

* cited by examiner

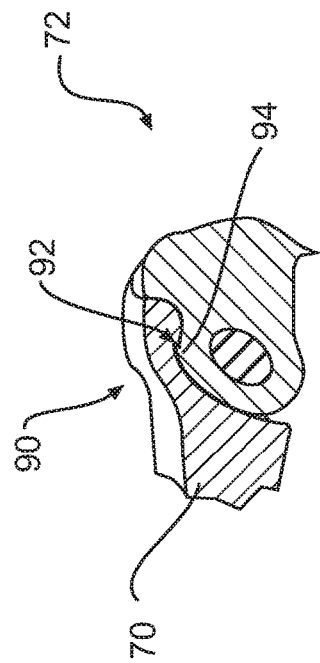
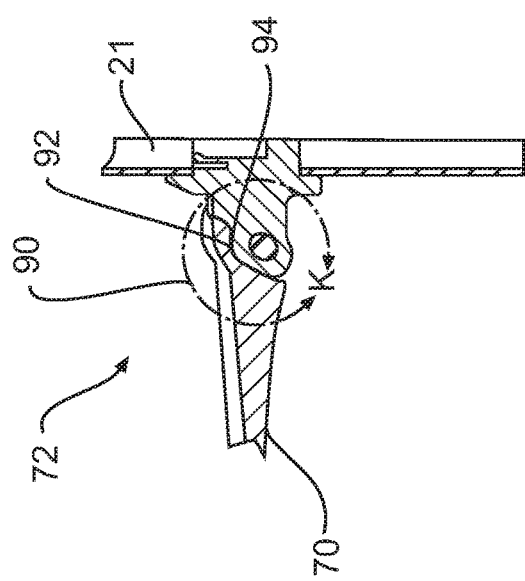

MIXER ASSEMBLY APPARATUS AND METHOD

FIELD OF THE INVENTION

The present disclosure generally relates to an impeller. More particularly, the present disclosure pertains to a folding impeller for use in a mixing system or assembly that utilizes containers or vessels having relatively small openings for mixer insertion.

BACKGROUND

Mixing and blending applications, in particular the mixing and blending of liquids, liquid suspensions and gases, are often constrained by the diameter of the tank in which the mixing is being carried out and by the diameter of the impeller. Moreover, the size and diameter of the manway through which the impeller and shaft is inserted can further constrain the mixing application and the impeller employed.

The impeller blades need to be inserted through the manway in the vessel for installation. In some covered mixing vessels, manways are commonly 24" in size and can pass impeller blades of up to 23" in width at best. Therefore, in order to insert larger blades, operators either have to install an oversized manway, or the blades must be supplied in a longitudinally split configuration and then assembled inside the vessel. Splitting the impeller blades is an expensive operation, especially for blades having a rounded, leading edge, twist and curvature. In addition, multiple bolts are required along with match marking to assure proper, gap free re-assembly. This process can be very difficult and time consuming because the inner and outer blade components must be aligned correctly so that the impeller balance and blade geometry will not be compromised.

Thus for vessels or containers with relatively small manways, it may be advantageous to utilize a folding impeller as an alternative to splitting the impeller blades or employing an oversized manway. However, conventional folding impellers suffer from a variety of deficiencies. For example, folding impellers must be held well away from the bottom of the container to reduce damage to the container and/or blades in the folded position. Also, the folding mechanism of conventional impellers causes serious disturbances in laminar flow of fluid around the impeller blades. Accordingly, it is desirable to provide an impeller that is capable of overcoming the disadvantages described herein at least to some extent.

SUMMARY

The foregoing needs are met, to a great extent, by embodiments the present disclosure, wherein in one respect an impeller is provided that is capable of mixing fluids in a container.

An embodiment of the present invention relates to an attachment assembly for attaching an impeller system to a vessel or the like. The attachment assembly includes: a frame having: a first end and a second end generally opposing one another; a first side that extends between the first and second ends; a second side that extends between the first and second ends generally parallel to the first side; a first rotational rod having first and second ends that extends between the first and the second sides; and a second rotational rod having first and second ends that extends between the first and the second sides; a base plate disposed on the frame, wherein the base plate extends between the first and the second sides and has a bore extending therethrough; a locking lever; a first bracket connected to the locking lever and the first rotational rod; a second bracket connected to the locking lever and the second rotational rod; a first latch mounted to the first rotational rod; and a second latch mounted to the second rotational rod.

Another embodiment pertains to an impeller drive assembly for driving a mixing impeller or the like. The impeller drive assembly includes: an attachment assembly having: a frame having: a first end and a second end generally opposing one another; a first side that extends between the first and second ends; a second side that extends between the first and second ends generally parallel to the first side; a first rotational rod having first and second ends that extends between the first and the second sides; and a second rotational rod having first and second ends that extends between the first and the second sides; a base plate having a bore disposed on the frame, wherein the base plate extends between the first and the second sides; a locking lever; a first bracket connected to the locking lever and the first rotational rod; a second bracket connected to the locking lever and the second rotational rod; a first latch mounted to the first rotational rod; and a second latch mounted to the second rotational rod; and a motor releasably mounted to the attachment assembly.

Yet another embodiment relates to a method for attaching an impeller assembly to a vessel or the like. The impeller assembly includes: connecting an attachment assembly to the vessel, the attachment assembly having: a frame having: a first end and a second end generally opposing one another; a first side that extends between the first and second ends; a second side that extends between the first and second ends generally parallel to the first side; a first rotational rod having first and second ends that extends between the first and the second sides; and a second rotational rod having first and second ends that extends between the first and the second sides; a base plate having a bore disposed on the frame, wherein said base plate extends between the first and the second sides; a locking lever; a first bracket connected to the locking lever and the first rotational rod; a second bracket connected to the locking lever and the second rotational rod; a first latch mounted to the first rotational rod; and a second latch mounted to the second rotational rod; translating the locking lever to a first position, urging the first and second latch to engage the vessel; and mounting a motor to the base plate of the attachment assembly.

In yet another embodiment pertains to an attachment assembly for attaching an impeller system to a vessel or the like. The attachment assembly includes: means for connecting an attachment assembly to the vessel, the attachment assembly having: a frame having: a first end and a second end generally opposing one another; a first side that extends between the first and second ends; a second side that extends between the first and second ends generally parallel to the the first side; a first rotational rod having first and second ends that extends between the first and the second sides; and a second rotational rod having first and second ends that extends between the first and the second sides; a base plate having a bore disposed on the frame, wherein the base plate extends between the first and the second sides; a locking lever; a first bracket connected to the locking lever and the first rotational rod; a second bracket connected to the locking lever and the second rotational rod; a first latch mounted to the first rotational rod; and a second latch mounted to the second rotational rod; means for translating the locking lever to a first position, urging the first and second latch to engage the vessel; and means for mounting a motor to the base plate of the attachment assembly.

In another embodiment of the present invention, an impeller assembly, is disclosed. The impeller assembly includes: a hub; a first blade; a second blade; a first hinge having a first tab and first detent connected to the hub. The first hinge pivotally secures the first blade to the hub. A second hinge has a second tab and a second detent is connected to the hub. The second hinge pivotally secures the first blade to the hub.

In an embodiment of the present invention, an impeller assembly is disclosed. The impeller assembly includes: a hub having: a first hinge integral thereto having a first tab and first detent; and a second hinge integral thereto having a first tab and first detent connected a first blade connected to the first hinge; and a second blade connected to the first hinge.

Another embodiment discloses a method of positioning an impeller into an operating position. The method includes the steps of: inserting the impeller in to a mixing vessel or the like, wherein the impeller has: a hub; a first blade; a second blade; a first hinge having a first tab and first detent connected to the hub, wherein the first hinge pivotally secures the first blade to said hub; a second hinge having a second tab and a second detent connected to the hub, wherein the second hinge pivotally secures the first blade to said hub; translating the first blade to the operating position by pivoting the first blade whereby the first tab engages the first detent such that the first blade extends outwardly from the hub; and translating the second blade to the operating position by pivoting the second blade whereby the second tab engages the second detent such that the second blade extends outwardly from the hub.

In still another embodiment of the present invention, an impeller assembly is disclosed. The impeller assembly includes: means for inserting the impeller in to a mixing vessel or the like. The impeller has: a hub; a first blade; a second blade; a first hinge having a first tab and first detent connected to the hub, wherein the first hinge pivotally secures the first blade to the hub; a second hinge having a second tab and a second detent connected to the hub, wherein the second hinge pivotally secures the first blade to the hub; means for translating the first blade to the operating position by pivoting the first blade whereby the first tab engages the first detent such that the first blade extends outwardly from the hub; and means for translating the second blade to the operating position by pivoting the second blade whereby the second tab engages the second detent such that the second blade extends outwardly from the hub.

In another embodiment of the present invention, an impeller assembly is disclosed. The impeller assembly includes: a sleeve having a first end and a second end; a bung hole closure sealingly disposed at the first end; and an impeller disposed at the second end, the impeller having: a hub; a first blade; a second blade; a first hinge having a first tab and first detent connected to the hub, wherein the first hinge pivotally secures the first blade to the hub; and a second hinge having a second tab and a second detent connected to the hub, wherein the second hinge pivotally secures the first blade to the hub.

In yet another embodiment, a mixing apparatus and system is disclosed. The mixing apparatus includes: a vessel having a bung hole disposed on an upper surface thereof; a motor attached to the vessel. The motor has a shaft; an attachment assembly to attach the motor to the vessel; and an impeller assembly having: a sleeve having a first end and a second end, the shaft is configured to slide within the sleeve; a bung hole closure disposed at the first end, the bung hole closure is configured to mate with the bung hole; and a sleeve having a first end and a second end; a bung hole closure sealingly disposed at the first end; and an impeller disposed at the second end, the impeller having: a hub; a first blade; a second blade; a first hinge having a first tab and first detent connected to the hub, wherein the first hinge pivotally secures the first blade to the hub; and a second hinge having a second tab and a second detent connected to the hub, wherein the second hinge pivotally secures the first blade to the hub.

In still yet another invention of the present invention, a method for mixing multiple components within a mixing vessel is disclosed. The method includes the steps of: inserting an impeller assembly into the vessel, wherein the impeller assembly has: a motor attached to the vessel, wherein the motor has a shaft; an attachment assembly to attach the motor to the vessel; and a sleeve having a first end and a second end; a bung hole closure sealingly disposed at the first end; and an impeller disposed at the second end, the impeller having: a hub; a first blade; a second blade; a first hinge having a first tab and first detent connected to the hub, wherein the first hinge pivotally secures the first blade to the hub; and a second hinge having a second tab and a second detent connected to the hub, wherein the second hinge pivotally secures teh first blade to the hub; translating the first blade to an operating position by pivoting the first blade whereby the first tab engages the first detent such that the first blade extends outwardly from the hub; and translating the second blade to the operating position by pivoting the second blade whereby the second tab engages the second detent such that the second blade extends outwardly from the hub.

And finally, another embodiment of the present invention discloses a mixing system apparatus. The mixing system apparatus includes: means for inserting an impeller assembly into the vessel. The impeller assembly has: a motor attached to the vessel, wherein the motor has a shaft; an attachment assembly to attach the motor to the vessel; and a sleeve having a first end and a second end; a bung hole closure sealingly disposed at the first end; and an impeller disposed at the second end, the impeller having: a hub; a first blade; a second blade; a first hinge having a first tab and first detent connected to the hub, wherein the first hinge pivotally secures the first blade to the hub; and a second hinge having a second tab and a second detent connected to the hub, wherein the second hinge pivotally secures the first blade to the hub. means for translating the first blade to an operating position by pivoting the first blade whereby the first tab engages the first detent such that the first blade extends outwardly from the hub; and means for translating the second blade to the operating position by pivoting the second blade whereby the second tab engages the second detent such that the second blade extends outwardly from the hub.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

BRIEF DESCRIPTION OF THE DRAWINGS

FIG. 9 is a cross sectional view of a locking mechanism for the impeller system in accordance with an embodiment of the present invention.

FIG. 10 is a more detailed view of the locking mechanism illustrated in FIG. 9.

DETAILED DESCRIPTION OF THE PREFERRED EMBODIMENT

Figure 1:
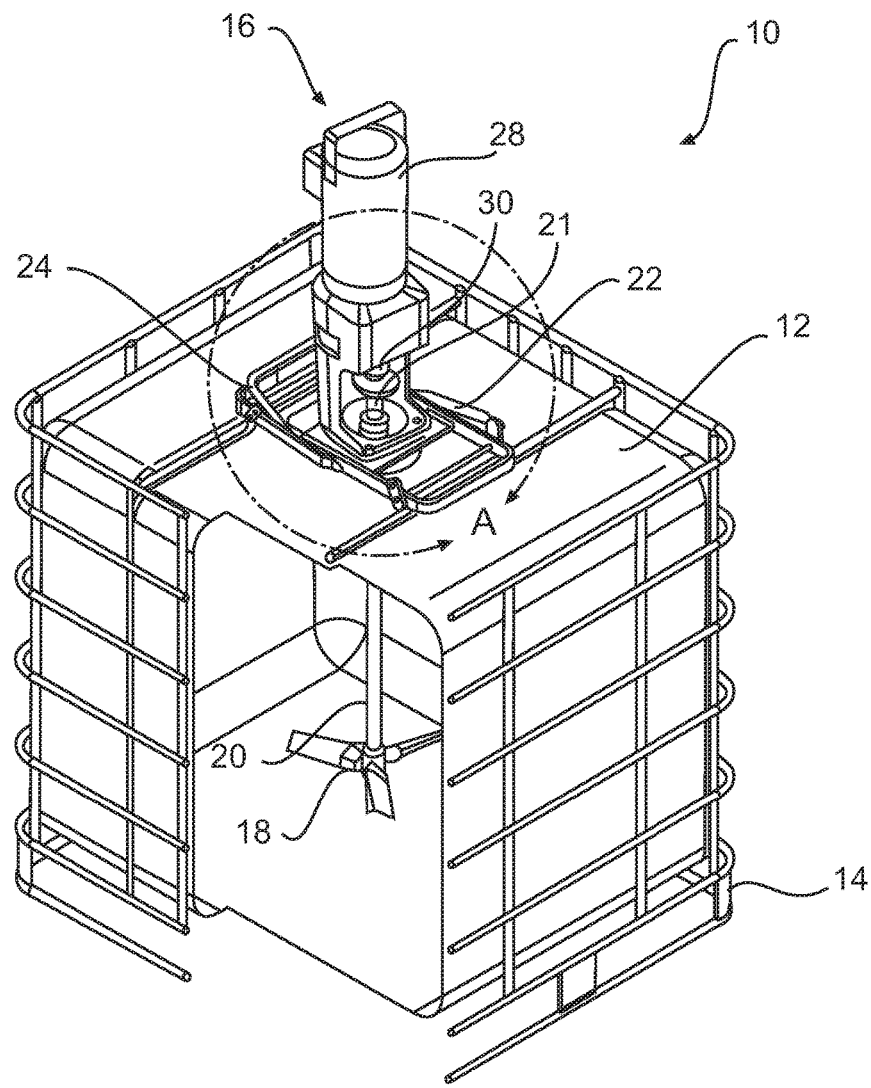
FIG. 1 is a cutaway perspective view of an impeller system in accordance with an embodiment of the present invention.

An embodiment will now be described with reference to the drawing figures, in which like reference numerals refer to like parts throughout. FIG. 1 is a cutaway perspective view of a mixing system generally designated 10. The mixing system 10 has a container or mixing vessel 12 having support frame or cage 14 extending at least partially around the mixing vessel 12. As illustrated in FIG. 1, the mixing system 10 includes an impeller assembly 16 that includes an impeller 18, sleeve 20 through which a drive shaft 21 extends, and bung closure 22. The impeller assembly 16 further includes a mounting bracket assembly 24, which will be discussed in further detail below, motor mount 26, motor 28, and an output shaft 30.

In general, the motor 28 is configured to rotate the drive shaft 21. The drive shaft 21 is configured for insertion down through the bung closure 22 and sleeve 20 to engage with the impeller 18. Rotation of the drive shaft 21 urges the impeller 18 to rotate.

Figure 2:
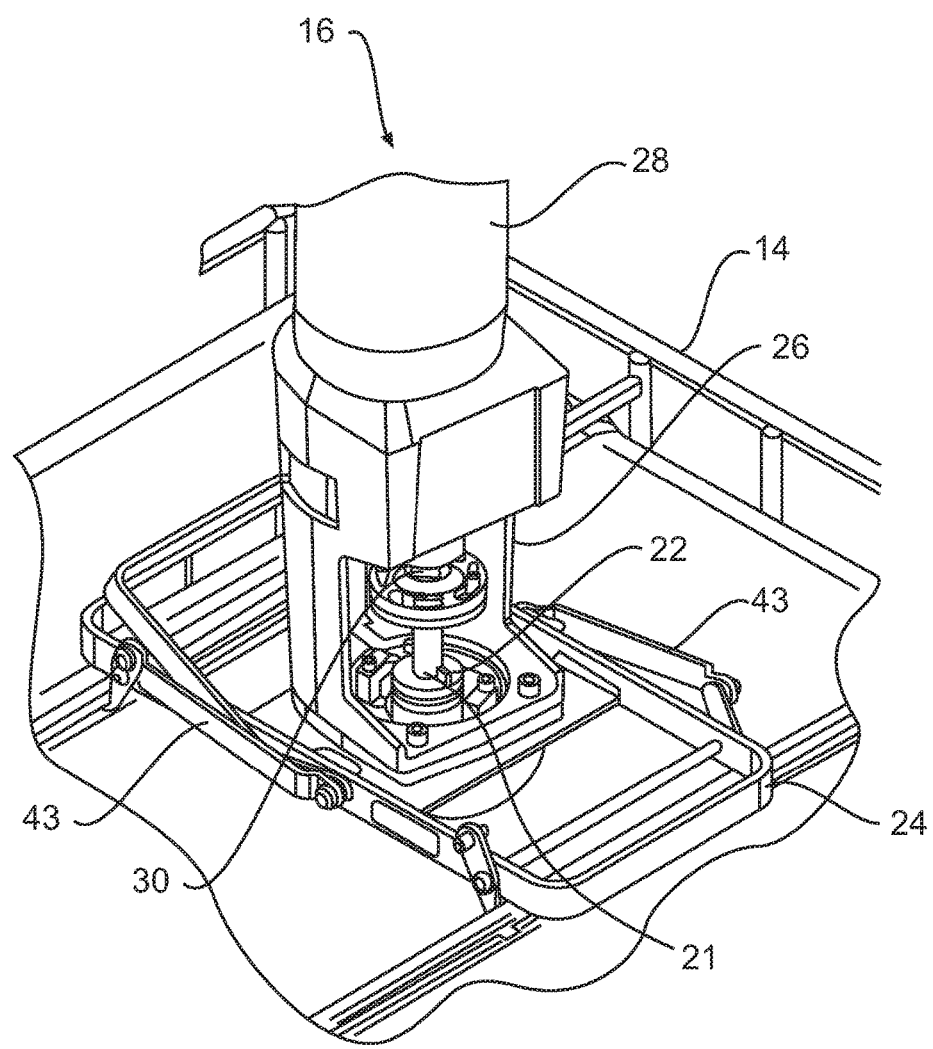
FIG. 2 is a detailed view of FIG. 1.
Figure 3:
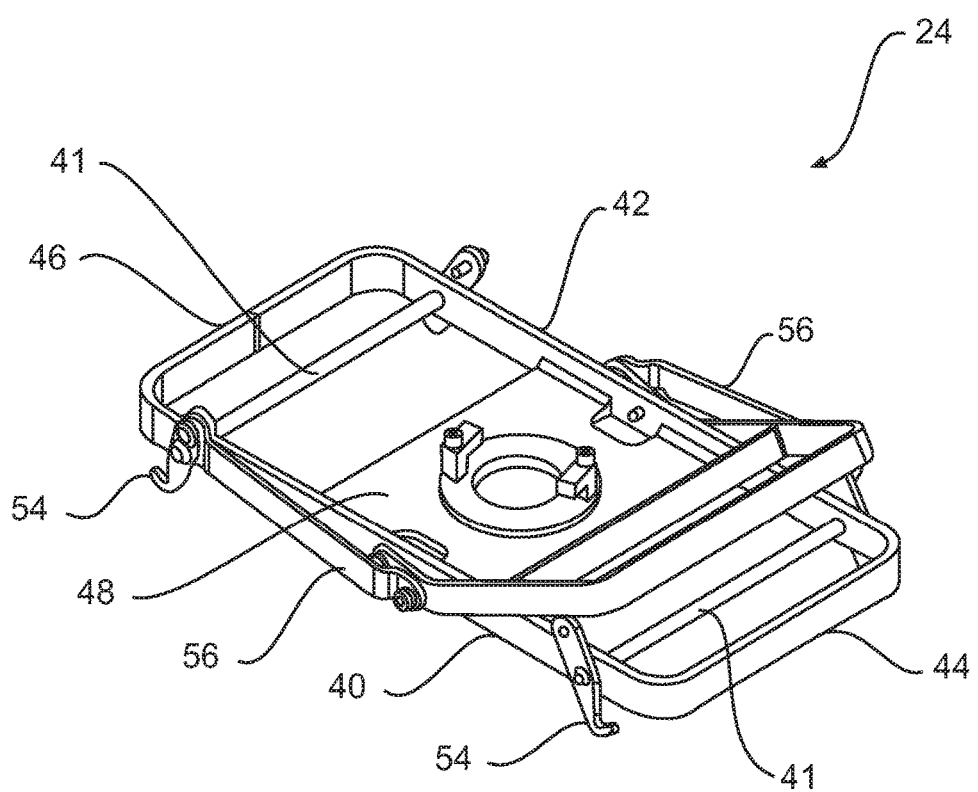
FIG. 3 is a perspective view of a mounting bracket assembly in accordance with an embodiment of the present invention.

Turning specifically to FIGS. 2 and 3, a more detailed view of FIG. 1 is set forth illustrating the mixing assembly 16 which includes the mounting bracket assembly 24 and the motor mount 26. As shown in FIG. 2, the mixing assembly 16 comprises upper and lower flanges, 32 and 34 respectively, wherein the upper flange 32 is attached the output shaft 30 while the lower flange 34 is attached to the drive shaft 21. As depicted in FIG. 2, the upper flange 32 has a series of slots 36 positioned about its periphery while the lower flange 34 has a series of dogs 38 positioned about its periphery extending therefrom. During operation, the upper flange 32 and lower flange 34 are releasably connected to one another via the above-described dogs and slots. For example, the dogs 38 mate with the slots 36 wherein the dogs 38 are inserted into the respective slot 36, and the shafts are rotated such that the dogs engage the upper flange 32 and retain the upper 32 and lower 34 flanges in place.

Turning now to FIG. 3, a perspective view of the mounting bracket assembly 24 in accordance with an embodiment of the present invention is illustrated. As shown in FIG. 3, the mounting bracket assembly 24 may be generally rectangular in geometry having first and second opposing sides 40 and 42 along with opposing ends 44 and 46. The mounting bracket assembly further includes rods 41 that extend generally parallel to one another between the opposing sides 40 and 42 along with a base plate 48 upon which the motor mount 26 and impeller assembly 16 is attached. The base plate 48 extends between the first and second sides 40, 42 and has a circular bracket 50 that assists in aligning the mounting bracket assembly 24 to the motor 28. The base plate 48 has a circular opening that aligns the bracket to the vessel. The circular bracket 50 has at least two dogs 52 disposed thereon attaching the motor to the bracket. The mounting bracket assembly 24 further includes latching connectors 54 that releasably attach the mounting bracket assembly 24 and thus the motor mount 26 (shown in FIGS. 1 and 2) to the vessel via the cage 14. The bracket assembly 24 attaches the motor mount via a sling lever action that comprises a pair of side brackets 43 mounted to the sides 40, 42 that are actuated via a single lever action 58 that operates to rotated the latching connectors 54 into the locked and unlocked position. The side brackets 43 engage the latching connectors 54 at the rods 41. Depending upon the embodiment, the rods 41 may rotate with the latching connectors 54 or otherwise remain stationary.

Figure 4:
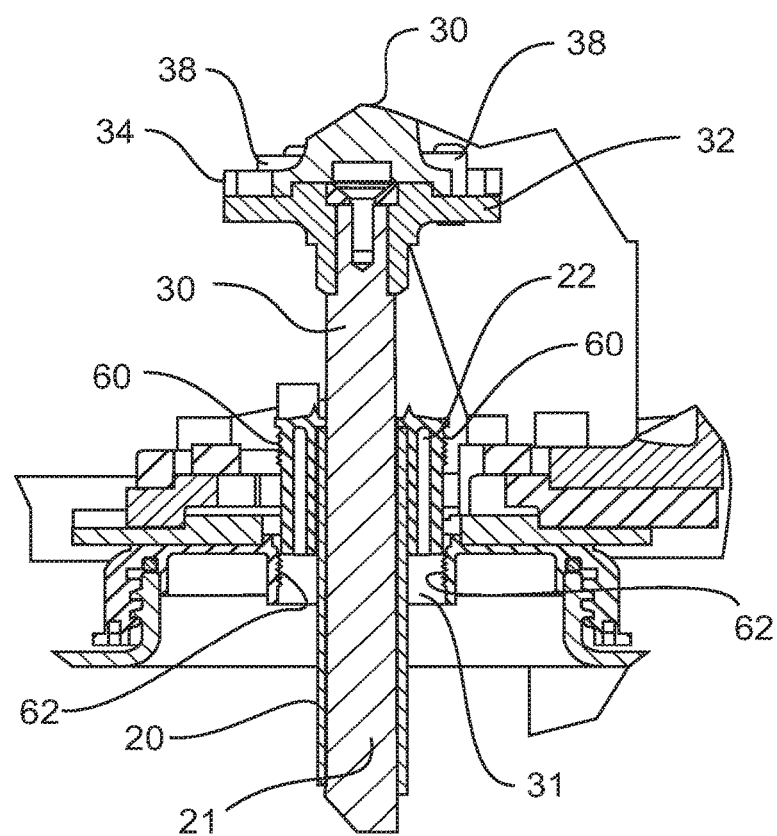
FIG. 4 is a cross sectional view of the impeller system in a first position.

Turning now to FIG. 4, a cross sectional view of the impeller system 10 in a first position or operating position is depicted. By operating position, it is meant that the upper flange 32 and lower flange 34 are mated to one another via the slots 36 and dogs 38, therefor mating the drive shaft 21 to the output shaft 30 of the motor. Moreover, due to the aforementioned mating, the drive shaft 21 is translated upward and thus the bung hole 31 of the vessel 12 is open because the bung closure 22 is disposed relatively above the bung hole 31 of the vessel. This described disposition of the bung closure 22 is due to the previously described translation of the drive shaft 21.

In this first position, threads 60 disposed upon the bung closure 22 are not mated to or engaged with threads 62 disposed within the bung hole 31 allowing for the drive shaft 21 to freely rotate. Also shown in FIG. 4, the drive shaft 21 extends down through the sleeve 20.

Figure 5:
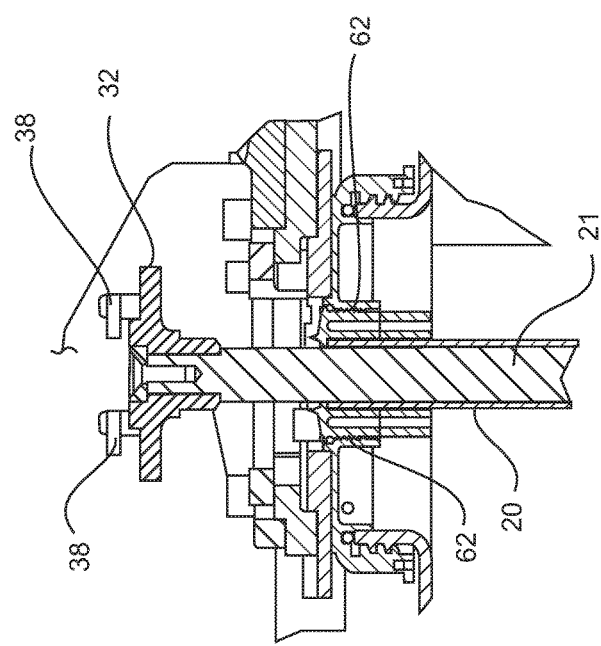
FIG. 5 is a cross sectional view of the impeller system in a second position.

Moving on to FIG. 5, whereas FIG. 4 illustrated the assembly in a first or operating position, FIG. 5 depicts a cross sectional view of the impeller system 10 in a second position or closed, shipping position. By closed position it is meant that the upper flange 32 and lower flange 34 are no longer mated to one another via the slots 36 and dogs 38 and disconnected from one another and in turn, disconnecting the drive shaft 21 from the output shaft 30 of the motor 28. Moreover, due to the aforementioned disconnection, the drive shaft 21 is removed from the sleeve 20. Furthermore, as illustrated in FIG. 5, the bung closure 22 is now disposed within the bung hole 31. As illustrated in this second position, threads 60 disposed upon the bung closure 22 are mated to or engaged with threads 62 disposed within the bung hole 31 thus sealing the vessel. As such, the impeller assembly 16 is secured to the container and may be shipped without the likelihood of spillage.

Figure 7:
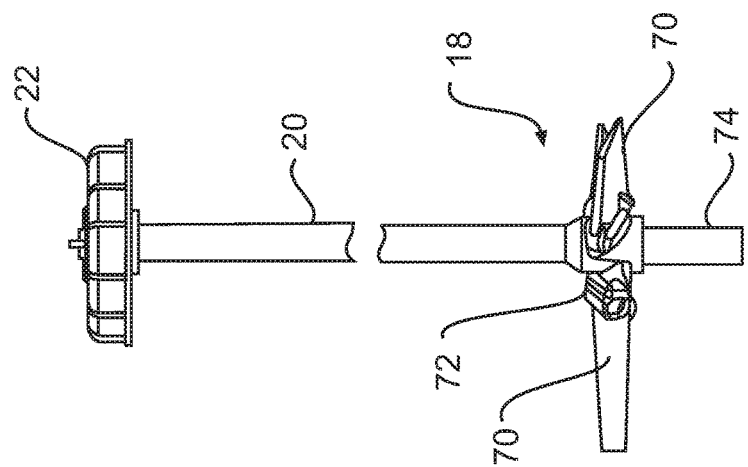
FIG. 7 is another side view of the impeller assembly depicted in FIG. 6.
Figure 6:
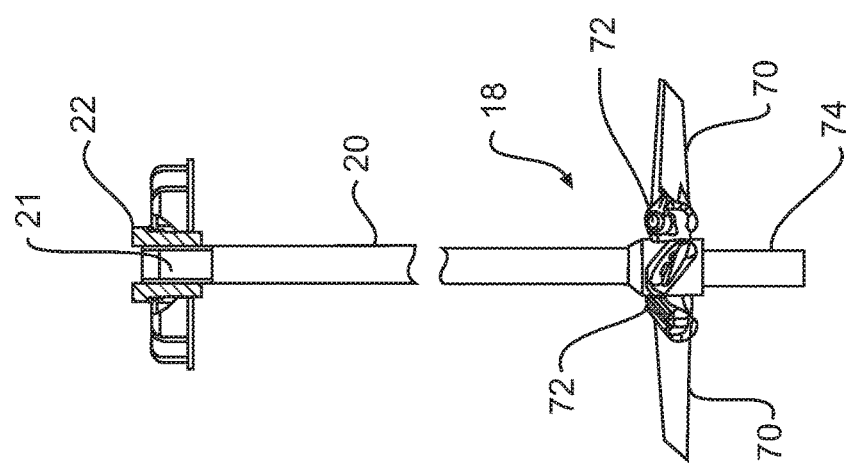
FIG. 6 is a side view of an impeller assembly in accordance with an embodiment of the present invention.

Turning to FIGS. 6 and 7, each is a side view of a portion of the impeller assembly 16 in accordance with an embodiment of the present invention. More particularly, FIGS. 6 and 7 illustrate the portion of the impeller assembly extending from the bung hole 31, into the vessel 12. As shown in FIG. 6, the impeller assembly 16 is a single sealed unit with the various components is friction welded or otherwise permanently affixed to one another. The impeller assembly 16 may be made from any suitable material or materials. Suitable materials include those with sufficient structural rigidity and strength to withstand being rotated in fluid and other such loads placed upon the impeller assembly 16. Specific examples of suitable materials include polymers such as polyethylene terephthalate (PETE), high-density polyethylene (HDPE), and the like.

Also shown in FIGS. 6 and 7, the impeller 18 includes a plurality of blades 70 that are substantially air foil in shape. That is, the blades 70 are configured to generate a laminar flow as they are driven through a fluid. In this manner, efficient mixing of the fluid within the container 12 may occur. This smooth and airfoil shape is particularly surprising given that the embodiment shown in FIGS. 6 and 7 is a folding impeller to facilitate ingress and egress from the bung hole 31. In this regard, each of the blades 70 includes a respective hinge 72.

Optionally, the impeller assembly 16 includes a post 74 to rest upon the bottom of the container 12 when the impeller assembly 16 is in the second position or shipping position.

Figure 8:
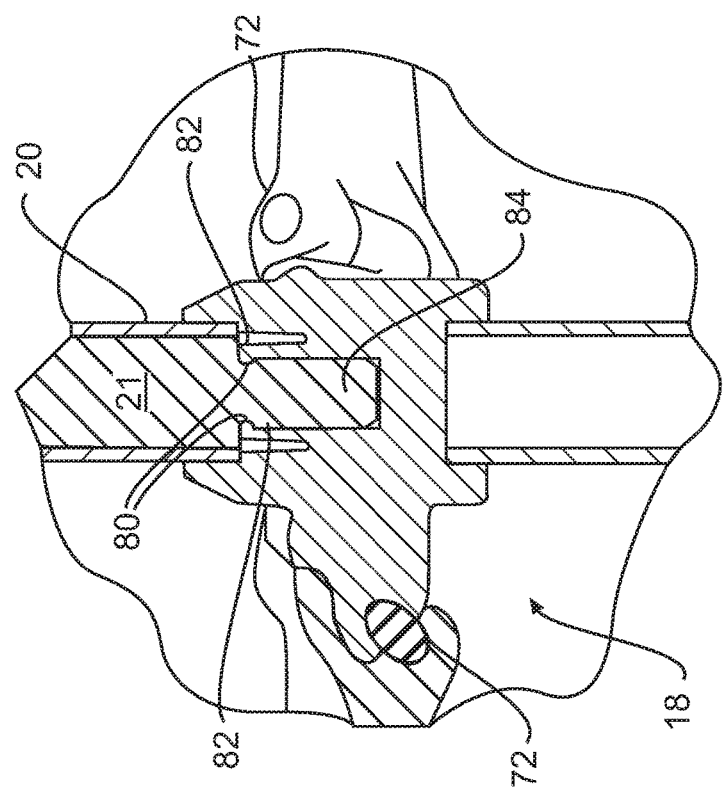
FIG. 8 is a cross sectional view of a drive shaft engaged to an impeller head in accordance with an embodiment of the present invention.

Turning now to FIG. 8, a cross sectional view of the drive shaft 21 connected to the impeller 18 in accordance with an embodiment of the present invention is illustrated. As depicted in FIG. 8, the drive shaft 21 includes detents 80 to receive and retain clips 82 in the impeller 18. In this manner, the shaft 21 is detachably secured to the impeller 18 and thus, the impeller assembly 16.

As illustrated in FIG. 8, the sleeve 20 encompasses the drive shaft 21 and is plastic welded to the impeller 18. Also, as depicted in FIG. 8, the end of the drive shaft 21, generally designated 84 has a two machined flats geometry that assists with the connection to the impeller 18. Moreover, the shaft end 84 has a preferred length to enable the impeller 18 to disengage from the shaft 21 and sleeve 20 if the drive shaft 21 were to detach from the drive shaft 21 or translate or shift downward during operation of the mixer assembly 10 preventing engagement of the bung threads 60, 62 while the motor 28 is rotating the output shaft 30.

Turning now to FIGS. 9 and 10, cross sectional views of the prior discussed hinge 72 are depicted. Specifically, the locking mechanism, each generally designated 90, for the blades 70 of the impeller 18 is depicted in detail. Whereas FIG. 9 shows the hinge 72 in combination with the mounting to the shaft 21 and the related connection thereto, FIG. 10 is a detailed depiction of the locking mechanism 90. As shown in both FIGS. 9 and 10, the blade 70 is oriented in the operating position. By operating position, in general, it is intended that the blades 70 are locked or retained in the operating position by a locking mechanism 90 of varying designs that are capable of retaining the blade 70 in the operating position, however in one embodiment of the present invention, the locking mechanism is preferably retained by a snap-lock.

As illustrated, in the particular example shown, the locking mechanism 90 of the hinge 72 includes a detent or snap down 92 that engages a sear or positive ramp 94. The detent 92 and sear 94 'snap' lock to retain the blade 70 in the operating position. Moreover, the aforementioned locking mechanism 90 is a single, one time use connection. By one time use it is meant that when the blade 70 is rotated from the operational position as illustrated, downward or upward as preferred, "shaving" or otherwise removal the sear 94 occurs, preventing the blade 70 from being locked in the operating position again. Thus, once the blade 70 is forced from the operating position, removing the sear 94, the snap-lock locking mechanism 90 may not be utilized again. Also shown in FIGS. 9 and 10 is a shaft 96 upon which the blade 70 pivots is shown. The shaft 96 appears oblong because the cross sectional view is taken at an oblique angle relative to the axis of the shaft 96.

Figure 12:
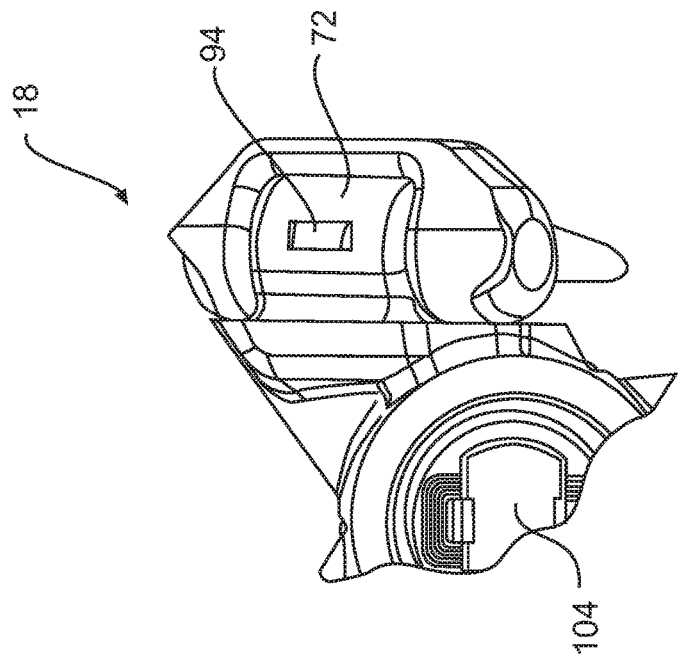
FIG. 12 is a more detailed view of the impeller the impeller hub.
Figure 11:
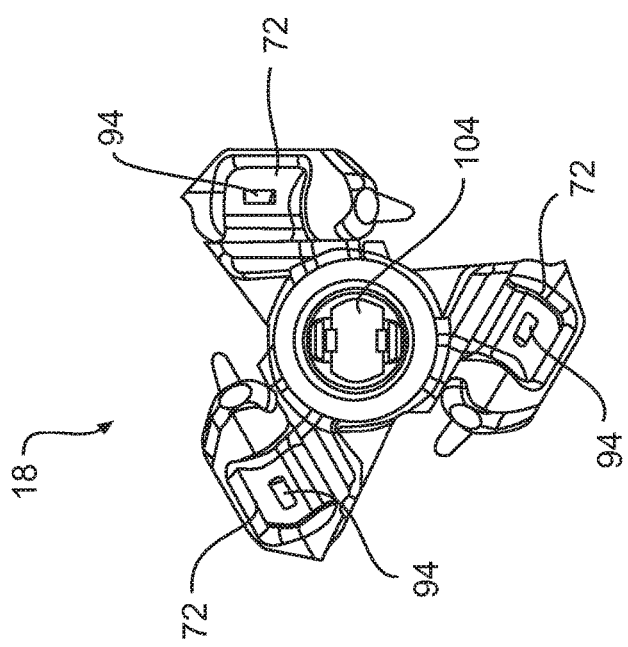
FIG. 11 is a plan view of the impeller hub in accordance with an embodiment of the present invention.

Referring now to FIGS. 11 and 12, isometric plan views of the impeller 18 in a folded position or non-operational position. For example, in this position, the impeller assembly 16 and accompanying impeller 18 may be inserted or removed from the vessel 12. As shown in FIGS. 11 and 12, the locking mechanism 90 comprises the detent 92 that engages the sear 94.

Also depicted in FIGS. 11 and 12, the impeller 18 includes a fitting 104 disposed in a hub 106 of the impeller 18 that receives the end portion 84 of the drive shaft 21. As previously discussed, the end of the drive shaft 21, generally designated 84 has a two machined flats geometry that assists with the connection to the impeller 18. Moreover, the shaft end 84 has a preferred length to enable the impeller 18 to disengage from the drive shaft 21 and sleeve 20 if the drive shaft 21 were to detach from the output shaft 30 or translate or shift downward during operation of the mixer assembly 10 preventing engagement of the bung threads 60, 62 while the motor 28 is rotating the output shaft 30. Thus, in the particular example shown, the fitting 104 is a double D type fitting. In other examples, the fitting 104 may include a square drive, hexagonal, or the like. The clips 82 are configured to retain the drive shaft 21 within the fitting 104.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A mixing apparatus and system comprising:
   a vessel having a bung hole disposed on an upper surface thereof;
   a motor attached to said vessel, wherein said motor has a shaft;
   an attachment assembly to attach the motor to the vessel, wherein said attachment assembly comprises:
   a frame comprising:

a first end and a second end generally opposing one another;

a first side that extends between said first end and second end of the frame;

a second side that extends between said first and second ends of the frame generally parallel to the first side;

a first rotational rod having first and second ends that extends between said first and said second sides; and a second rotational rod having first and second ends that extends between said first and said second sides;

a base plate disposed on said frame, wherein said base plate extends between said first and said second sides and has a bore extending therethrough;

a locking lever;

a first bracket connected to said locking lever and said first rotational rod;

a second bracket connected to said locking lever and said second rotational rod;

a first latch mounted to said first rotational rod; and a second latch mounted to said second rotational rod; and an impeller assembly comprising:

a sleeve having a first end and a second end, the shaft being configured to slide within the sleeve;

a bung hole closure disposed at the first end of the impeller assembly, the bung hole closure being configured to mate with the bung hole; and an impeller disposed at the second end of the impeller assembly, the impeller comprising:

a hub;

a first blade having a first sear;

a second blade having a second sear;

a first hinge having a first detent disposed on said hub, wherein said first hinge pivotally secures said first blade to said hub and the first blade is locked in an operational position defined as extending outwardly from the hub in response to the first sear engaging the first detent; and a second hinge having a second detent disposed on said hub, wherein said second hinge pivotally secures said second blade to said hub and the second blade is locked in the operational position in response to the second sear engaging the second detent.

2. The impeller according to claim 1, wherein said first hinge secures said first blade in the operational position for the first blade, and wherein said second hinge secures said second blade in the operational position for the second blade.

3. The impeller according to claim 1, further comprising:

a third blade having a third sear; and a third hinge having a third detent disposed on said hub, wherein said third hinge pivotally secures said third blade to said hub and the third blade is locked in the operational position in response to the third sear engaging the third detent.

4. The impeller according to claim 3, wherein said third hinge secures said third blade in the operational position for the third blade.

5. The attachment assembly according to claim 1, further comprising:

a third latch mounted to said first rotational rod, wherein said first latch is mounted at the first end of the first rotational rod and the second latch is mounted at the second end of the first rotational rod; and a fourth latch mounted to said second rotational rod, wherein said third latch is mounted at the first end of the second rotational rod and said fourth latch is mounted at the second end of the second rotational rod.

6. The apparatus according to claim 5, wherein said locking lever actuates to a first position that rotates said first and second rotational rods in a first direction and wherein said locking lever actuates to a second position that rotates said first and second rotational rods in a opposite second direction.

7. The apparatus according to claim 6, wherein said rotation of said first rod causes said first and second latches to swivel between a first latch position and a second latch position and wherein said rotation of said second rotational rod causes said third and fourth latches to swivel between the first latch position and the second latch position.

8. The apparatus according to claim 7, wherein said first position is an unlocked position and wherein said second position is a locked position.

\* \* \* \* \*